United States Patent [19]

Sakane

[11] Patent Number: 5,036,169

[45] Date of Patent: Jul. 30, 1991

[54] STEERING WHEEL HORN SWITCH

[75] Inventor: Katsunobu Sakane, Ichinomiya, Japan

[73] Assignee: Toyoda Gosei Co., Ltd., Nishikasugai, Japan

[21] Appl. No.: 497,319

[22] Filed: Mar. 22, 1990

[30] Foreign Application Priority Data

Mar. 27, 1989 [JP] Japan .......................... 1-34476[U]
Aug. 31, 1989 [JP] Japan .......................... 1-102253[U]

[51] Int. Cl.[5] .......................... H01H 9/00; B62D 1/04
[52] U.S. Cl. .............................. 200/61.54; 200/61.55
[58] Field of Search .......................... 200/61.54–61.57

[56] References Cited

U.S. PATENT DOCUMENTS

| | | | |
|---|---|---|---|
| 4,374,310 | 2/1983 | Kato et al. | 200/61.54 |
| 4,447,684 | 5/1984 | Sugiyama | 200/61.57 X |
| 4,594,486 | 6/1986 | Noda | 200/61.54 |
| 4,789,763 | 12/1988 | Nagata et al. | 200/61.54 |
| 4,899,020 | 2/1990 | Ohno et al. | 174/258 |

Primary Examiner—J. R. Scott
Attorney, Agent, or Firm—Cushman, Darby & Cushman

[57] ABSTRACT

A horn switch mechanism of a steering wheel comprises a stationary contact plate having a locking hole, a movable contact plate having a base portion fixed to the stationary contact plate and contact portions extending upward from the base portion, a depressing plate disposed above the movable contact plate, a horn pad disposed above the depressing plate. The depressing plate is connected to a lead wire electrically connected to the horn control circuit. An electrical insulation spacer made of sythetic resin having spring elasticity is disposed between the stationary contact plate and the movable contact plate. The electrical insulation spacer comprises a base member, a projection piece projecting from side portion of the base member through a thin or hinge portion for holding upper and lower surfaces of the base portion of the movable contact plate in cooperation with the base member during bending at the thin or hinge portion, and a locking leg locked to peripheral edge of the locking hole of the stationary contact plate.

9 Claims, 15 Drawing Sheets

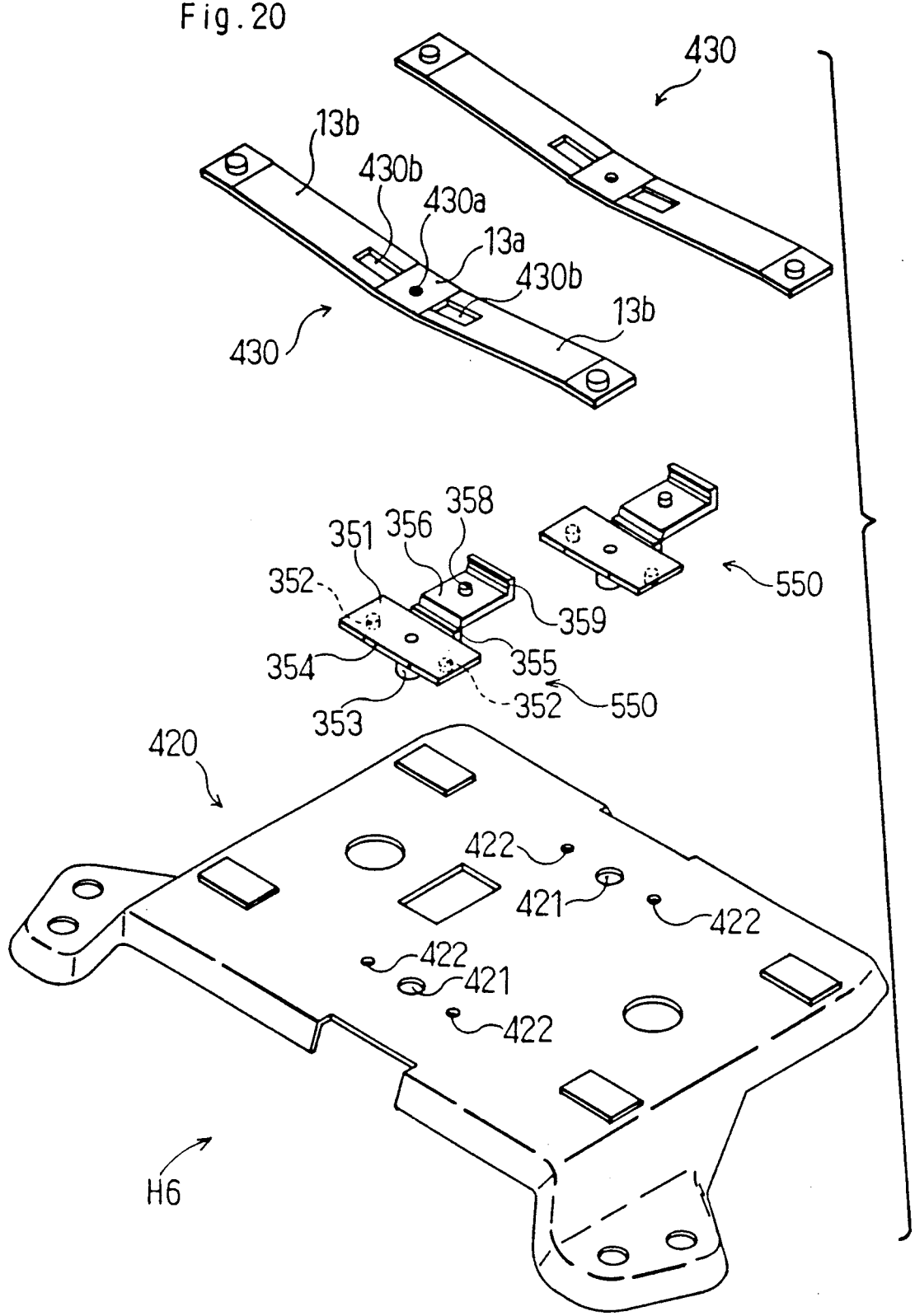

STEERING WHEEL HORN SWITCH

BACKGROUND OF THE INVENTION

1. Field of the Invention

The present invention relates to a horn switch mechanism mounted on a steering wheel of an automobile.

2. Description of the Prior Art

A conventional horn switch mechanism for a steering wheel is shown in FIGS. 1 and 2 (refer to U.S. Pat. No. 4,594,486).

This conventional horn switch mechanism HO is composed of a stationary contact plate 2 made of sheet metal and a movable contact plate 3 made of a metal plate spring.

The movable contact plate 3 is of turned H shaped (turned by ¼ revolution) viewing from the upper side. The longitudinal bar portion of the turned H shape defines a base portion 3a disposed to the side of the stationary contact plate 2 and lateral bar portions of the turned H shape define contact portions 3b extending upwardly from the base portion 3a.

Depressing plate 4 is provided on the upper surface of the contact portions 3b of the movable contact plate 3. The depressing plate 4 is restricted at the separation distance from the stationary contact plate 2 by a restricting means (not shown) and electrically insulated from the stationary contact plate 2. A horn pad 1 is disposed above the depressing plate 4.

The base portion 3a of the movable contact plate 3 is fixed to the stationary contact plate 2 through an electrical insulation plate 5 made of plate-shaped synthetic resin having an external configuration similar to that of the base portion 3a, an electrical insulation ring 6 made of circular ring shaped synthetic resin and a terminal 9 with L-like cross-section by a rivet 7 which is conductive.

The stationary contact plate 2 is secured to an energy absorber 10 made of sheet metal fixed to the steering wheel body, such as a boss (not shown) of the steering wheel, and the stationary contact plate 2 is electrically connected to the negative terminal of a horn control circuit through the energy absorber 10.

On the other hand, the movable contact plate 3 is electrically connected to side of a positive terminal of the horn control circuit through a lead wire 8 connected to the terminal 9.

In the horn switch mechanism HO, the horn pad 1 is depressed whereby the contact portions 3b of the movable contact plate 3 are depressed through the depressing plate 4 and contacts 3c of the contact portions 3b are brought into contact with contacts 2a of the stationary contact plate 2 and the horn is operated.

In the conventional horn switch mechanism HO, however, the movable contact plate 3 is locked by the rivet 7 to the stationary contact plate 2 through the electrical insulation plate 5, the electrical insulation ring 6 and the terminal 9 and therefore the number of the parts to be assembled is great.

Also at the locking by the rivet 7, since the four parts, i.e., the movable contact plate 3, the electrical insulation plate 5, the electrical insulation ring 6 and the terminal 9, must be arranged to the stationary contact plate 2, care must be taken so that various parts are not shifted and therefore the assembling work becomes troublesome.

SUMMARY OF THE INVENTION

It is therefore an object of the present invention to provide a horn switch mechanism of a steering wheel wherein the number of the assembling parts can be decreased and the assembling work becomes easy.

The above-described object is achieved by a horn switch mechanism of a steering wheel, which comprises:

a stationary contact plate made of sheet metal and having a locking hole at a predetermined position;

a movable contact plate made of a metal plate spring and having a base portion and contact portions extending upward from the base portion, said base portion being fixed to the upper surface near the locking hole of the stationary contact plate at electrically insulated state and said contact portions being arranged at separated state upward from the stationary contact plate;

a depressing plate made of sheet metal and abutting on upper surface of the contact portions of the movable contact plate and restricted at the separated distance from the stationary contact plate and electrically insulated from the stationary contact plate;

a depressing horn pad disposed above the depressing plate and bringing the contact portions of the movable contact plate into contact with the stationary contact plate through the depressing plate during the depressing operation;

a tongue formed on the depressing plate;

a lead wire connected to the tongue and electrically connected to the polarity side corresponding to that of the horn control circuit electrically connected to the stationary contact plate;

an electrical insulation spacer made of synthetic resin having electrical insulation property and spring elasticity and disposed between the stationary contact plate and the base portion of the movable contact plate;

said electrical insulation spacer comprising a base member, a projection piece projecting from side portion of the base member through a thin or hinge portion for holding the movable contact plate in cooperation with the base member, and locking legs locked to a peripheral edge of the locking holes of the stationary contact plate.

In the horn switch mechanism according to the invention, during assembly, the upper and lower surfaces of the base portion of the movable contact plate are held by the projection piece and the base member of the electrical insulation spacer, and then the locking legs of the electrical insulation spacer are locked to a peripheral edge of the locking hole of the stationary contact plate. Accordingly, an electrical insulation ring and a rivet of the prior art are not used but only one electrical insulation spacer is used so that the movable contact plate can be assembled to the stationary contact plate.

In the invention, the lead wire connected to the movable contact plate in the prior art may be connected utilizing, for example, a terminal or a rivet to a tongue of the depressing plate, the rivet being distinct from that provided in accordance with the conventional structure described above. Indeed, this rivet only couples two parts, i.e., the tongue and the terminal which can be performed easily. The conduction to the movable contact plate can be performed without hindrance because the depressing plate is made of sheet metal and assembled so as to abut the upper surface of the contact portion of the movable contact plate.

Consequently, in the horn switch mechanism of the steering wheel according to the invention, when the movable contact plate is assembled to the stationary contact plate, rather than an electrical insulation ring or a rivet assembly is possible by simply using one electrical insulation spacer whereby the number of the assembling parts can be decreased. Further, since connection of the lead wire to the tongue of the depressing plate becomes easy, in cooperation with the decrease of the number of the assembling parts, assembly is not difficult.

BRIEF DESCRIPTION OF THE DRAWINGS

FIG. 20 is a perspective view of a movable contact plate, an electrical insulation spacer and a stationary contact plate in a sixth embodiment.

DESCRIPTION OF THE PREFERRED EMBODIMENTS

With reference to the accompanying drawings, preferred embodiments of the present invention are described hereinbelow.

Figure 1:
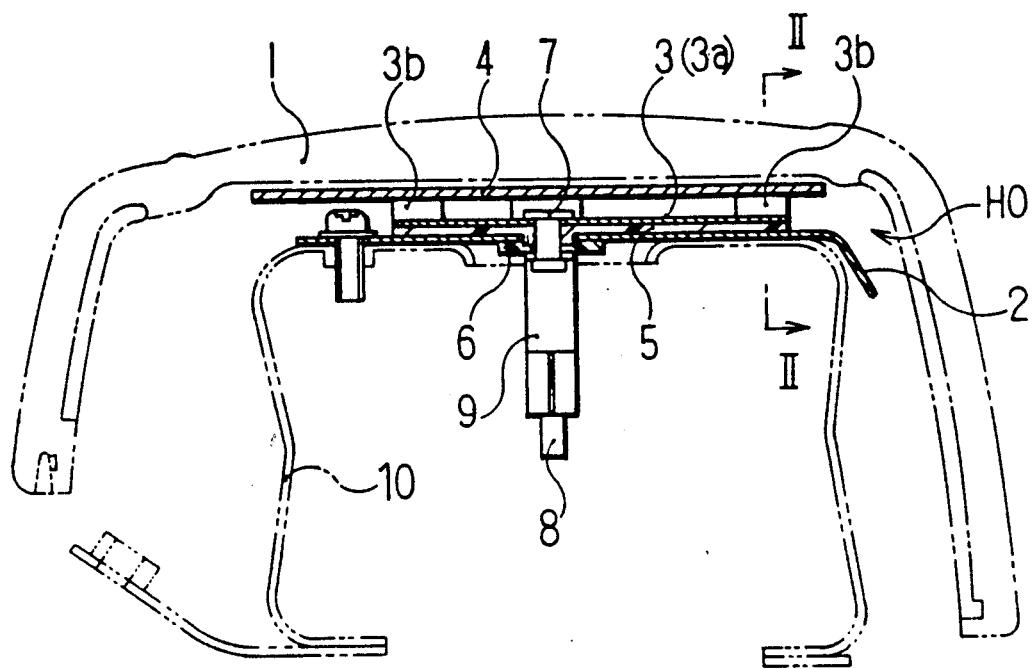
FIG. 1 is a sectional view of a horn switch mechanism in the prior art.
Figure 2:
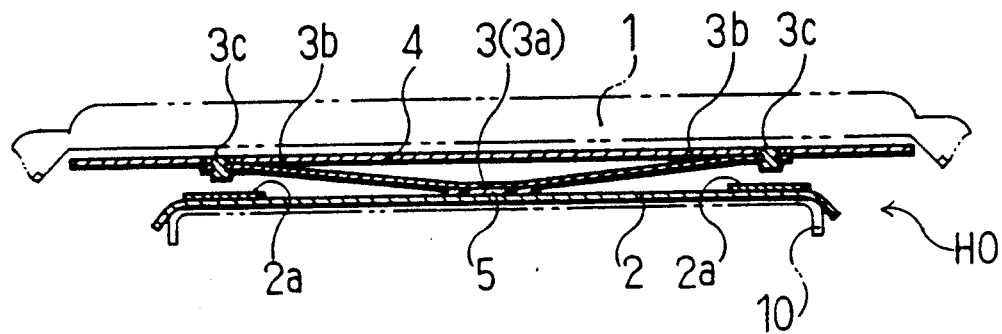
FIG. 2 shows a horn switch mechanism in the prior art and is a sectional view taken on line II—II of FIG. 1.
Figure 3:
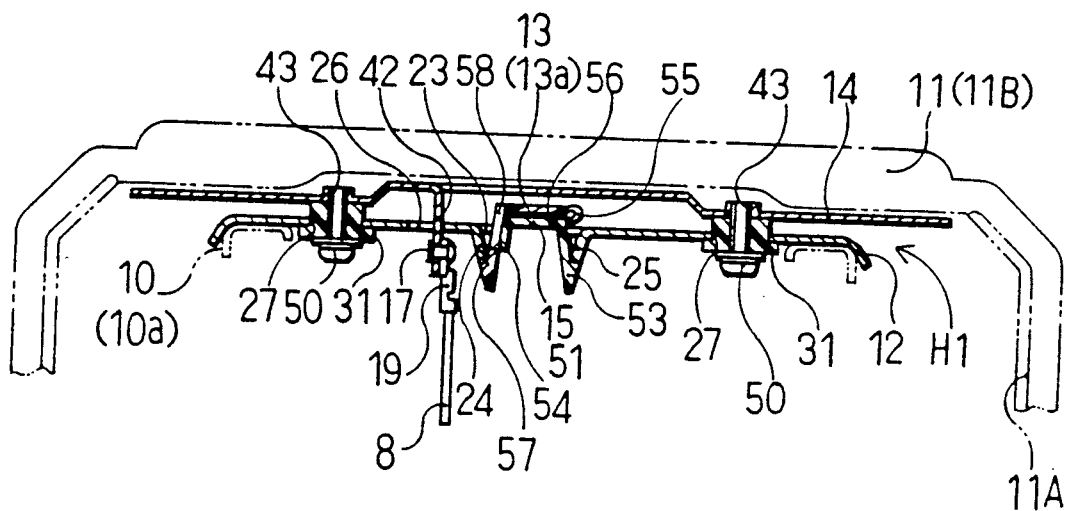
FIG. 3 shows a first embodiment of the invention and is a sectional view taken on line III—III of FIG. 7.
Figure 6:
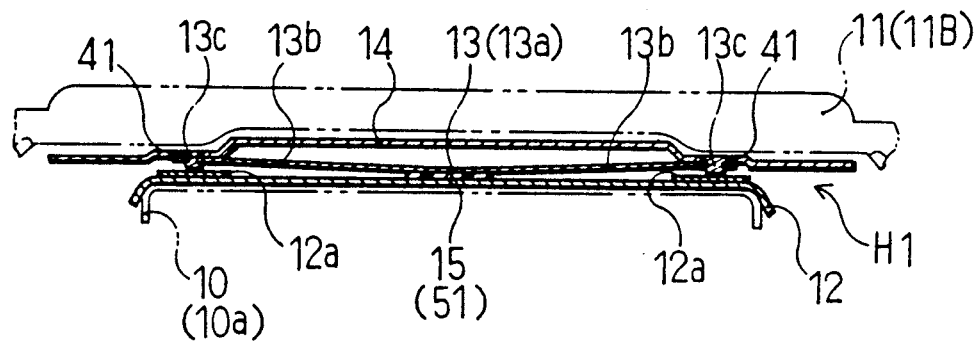
FIG. 6 is a sectional view taken on line VI—VI of FIG. 7.
Figure 7:
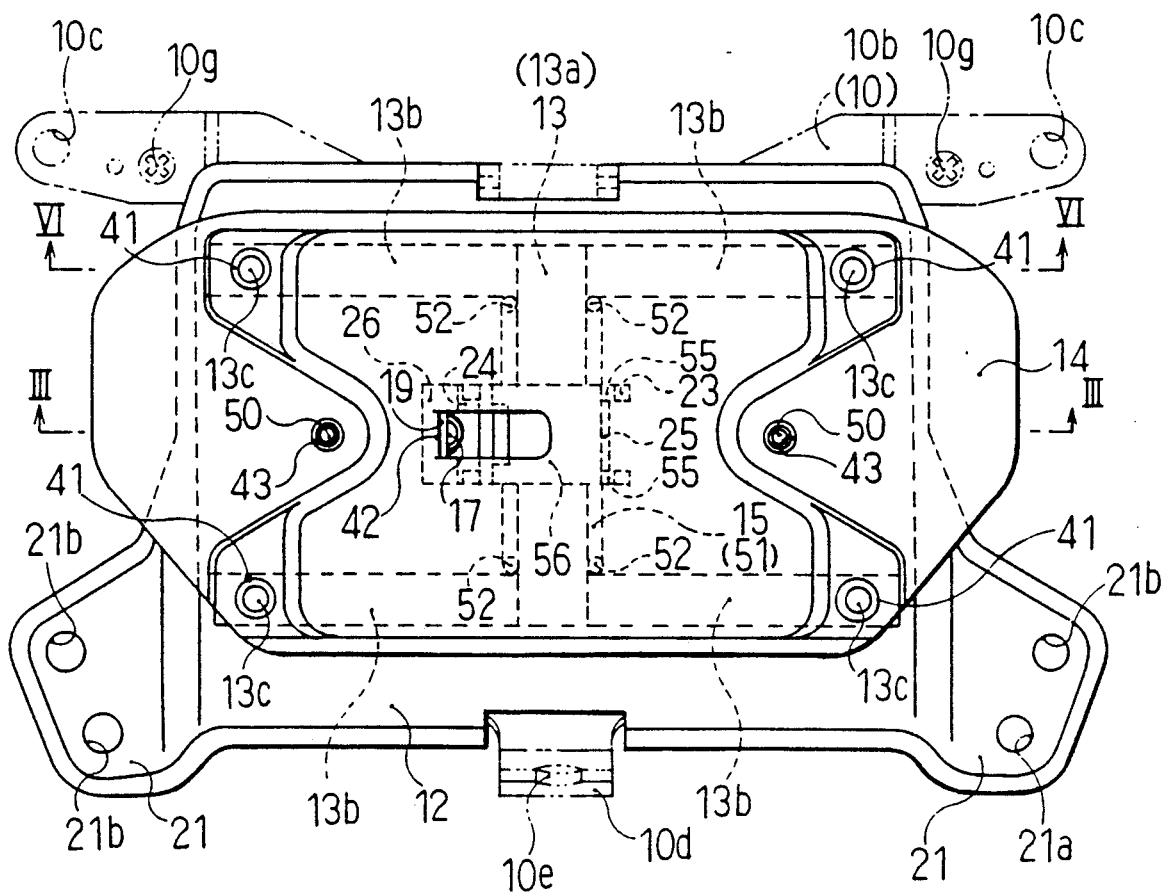
FIG. 7 is a plan view illustrating assembling state of a movable contact plate, an electrical insulation spacer and a stationary plate in the first embodiment.
Figure 8:
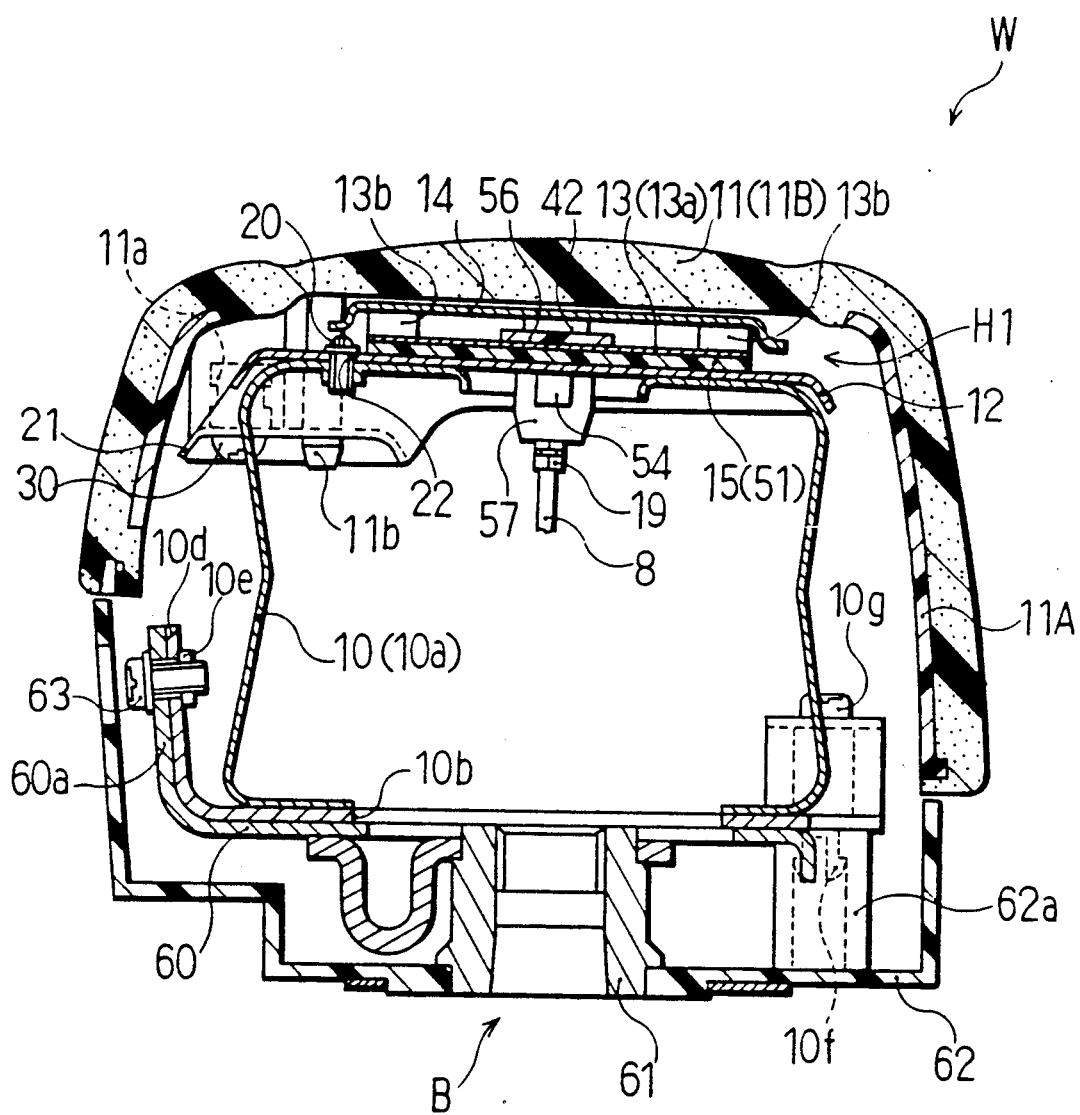
FIG. 8 is a sectional view of a steering wheel illustrating assembling state in the first embodiment and a sectional view taken on line VIII—VIII of FIG. 9.

A horn switch mechanism H1 shown in a first embodiment is constituted in arrangement above an energy absorber 10 as shown in FIGS. 3, 6 and 8. The energy absorber 10 as shown in FIGS. 3, 6 and 8. The energy absorber 10 is made of sheet metal, and constituted by a deforming member 10a with cross-section of nearly reverse U-like shape and a plate-shaped base portion 10b of rectangular ring shape fixed below the deforming member 10a as shown in FIG. 8, and fixed to side of body of a steering wheel W, such as a boss plate 60 in a boss member B of the steering wheel W. A stationary contact plate 12 is fixed above the deforming member 10a utilizing a screw 20 or welding.

The stationary contact plate 12 is made of sheet metal of nearly rectangular plate shape, and contacts 12a thereof are arranged at four corners of the peripheral edge as shown in FIG. 3–9. Projecting members 21 projecting outward are formed in lower plane by one step on two corners at the rear side of the steering wheel W, and two holes 21a, 21b are formed on each of the projecting members 21. The hole 21a is a threaded hole for inserting a screw 30 threadedly engaged with a nut 11a embedded in a horn pad 11 as hereinafter described, and the hole 21b is a positioning hole for inserting a projection 11b projecting downward from the horn pad 11. On both lateral sides nearly at the center of the stationary contact plate 12 are formed inserting holes 27 for arranging a restricting means 31 as hereinafter described.

On the stationary contact plate 12, a locking hole 23 is formed at the center portion. In the locking hole 23, locking portions 24, 25 bent downward are formed at peripheral edge opposed in the minor axis direction of the base portion 13a of a movable contact plate 13 when the movable contact plate 13 is arranged above the stationary contact plate 12.

Figure 5:
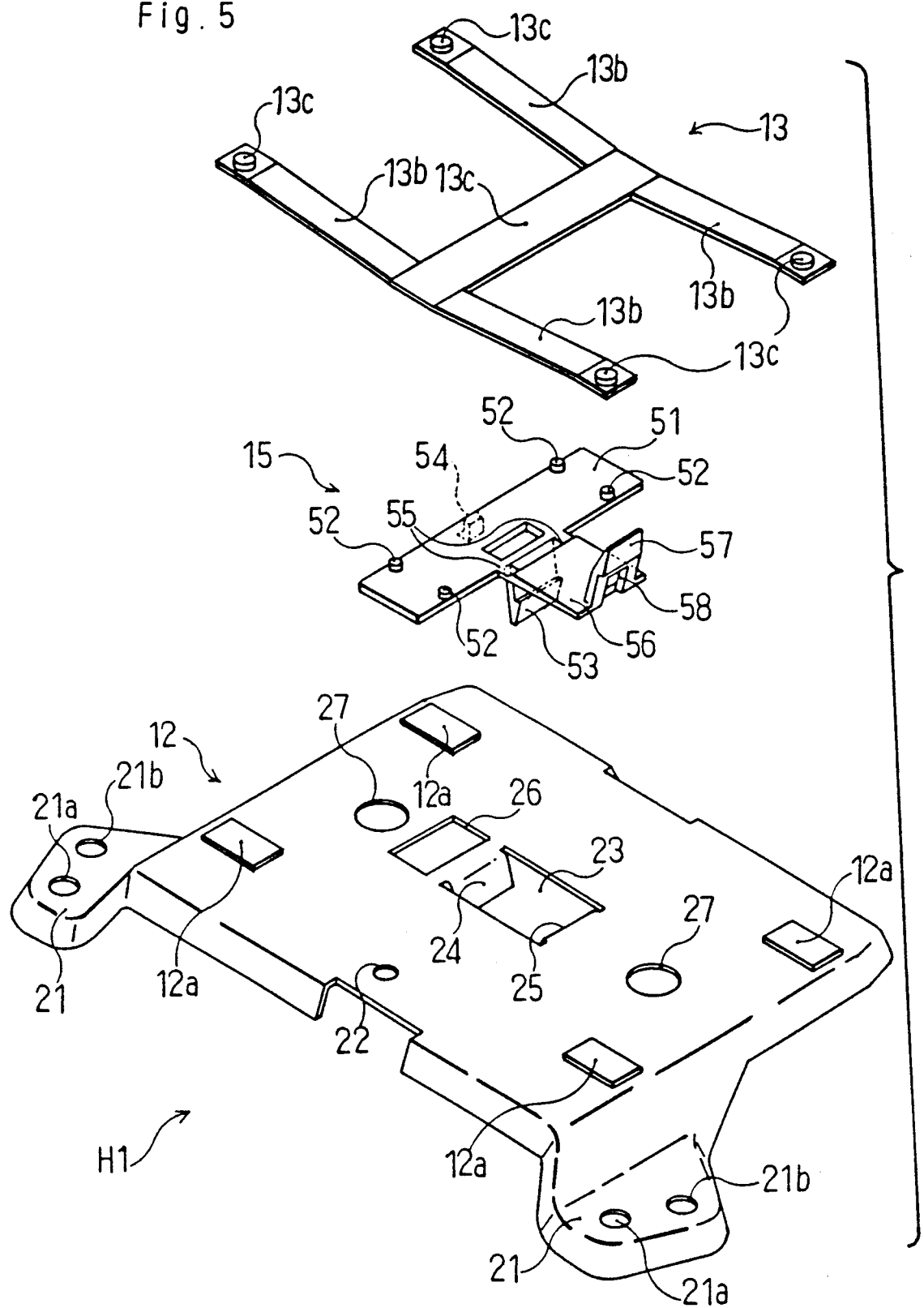
FIG. 5 is a perspective view of a movable contact plate, an electrical insulation spacer and a stationary contact plate in the first embodiment.

Numeral 22 designates a threaded hole when the stationary contact plate 12 is fixed by a screw 20 to upper side of the deforming member 10a in the energy absorber 10 (refer to FIG. 5 and 8). Also numeral 26 designates a through hole for inserting a tongue 42 of a depressing plate 14 as hereinafter described (refer to FIGS. 3 and 5).

The movable contact plate 13 arranged above the stationary contact plate 12 as shown in FIGS 3-8, is made of a metal plate spring in turned H shape viewing from the upper side in similar manner to the prior art, and longitudinal bar portion of the turned H shape is made a base portion 13a disposed to side of the stationary contact plate 12 and lateral bar portions of the turned H shape are made contact portions 13b extending upward from the base portion 13a, and a contact 13c corresponding to the contact 12a of the stationary contact plate 12 is formed to the end of each contact portion 13b.

An electrical insulation spacer 15 made of synthetic resin having electrical insulation property and spring elasticity, such as polypropylene is arranged between the base portion 13a of the movable contact plate 13 and the stationary contact plate 12.

The electrical insulation spacer 15 is provided with a base member 51 of nearly rectangular plate shape corresponding to the base portion 13a of the movable contact plate 13. The base member 51 is provided on both sides of the end in the major axis direction in the upper surface with position defining projections 52 spaced by distance corresponding to the width dimension of the base portion 13a (refer to FIGS. 5 and 7).

Figure 4:
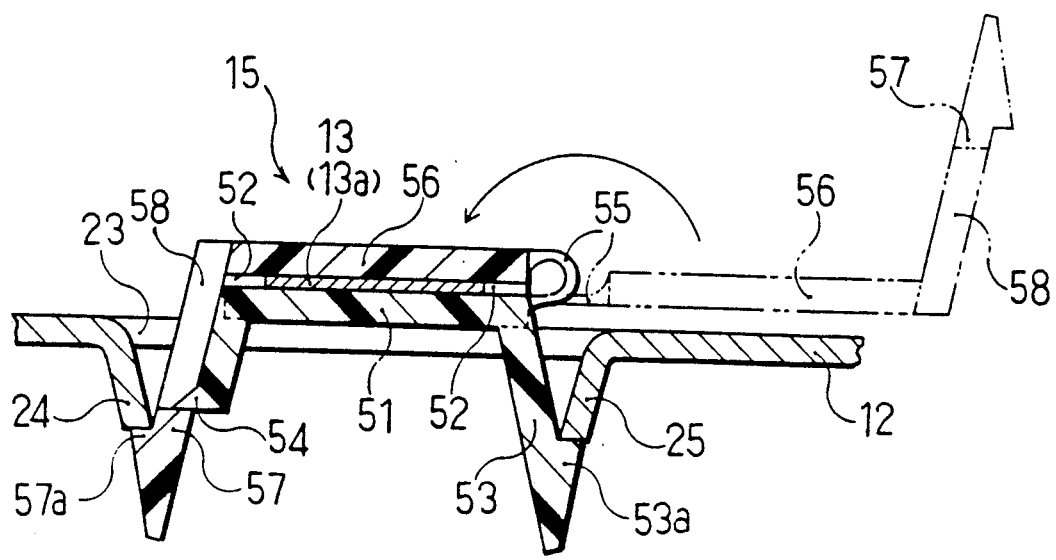
FIG. 4 is a sectional view illustrating mode that a movable contact plate in the first embodiment is assembled to a stationary contact plate.

The base member 51 as shown in FIGS. 4 and 5 is provided on one side portion of nearly at the center portion through two thin or hinge portions 55, 55 with a projection piece 56 projecting outward by nearly the same length as the width dimension in the minor axis direction of the base portion 13a of the movable contact plate 13. The projection piece 56 is bent at the thin or hinge portions 55, 55, and holds the base portion 13a of the movable contact plate 13 arranged on the upper surface of the base member 51 in cooperation with the base member 51.

At the end of the projection piece 56 and the neighboring portion with the thin or hinge portions 55, 55 in the base member 51, locking legs 57, 53 capable of being locked respectively to the locking portions 24, 25 in the locking hole 23 of the stationary contact plate 12 are formed when the base portion 13a of the movable contact plate 13 is held by the base member 51 and the projection piece 56.

A locking hole 58 is formed at the base portion side of the locking leg 57 in the projection 54 projecting downward is formed at the opposite portion to the portion where the thin portion 55 in the base member 51 is formed. The locking projection 54 and the locking hole 58 are engaged with each other, and when the base portion 13a of the movable contact plate 13 is held by the projection piece 56 bent at the thin portion 55 and the base member 51, the locking projection 54 and the locking hole 58 constitute the locking member to maintain the holding state.

On the upper surface near each contact 13c of the contact portion 13b in the movable contact plate 13, as shown in FIGS. 3 and 6 -9, a depressing plate 14 made of sheet metal in elliptic shape viewing from the upper side is arranged abutting on the circumference of each contact 13c.

The depressing plate 14 is provided with through holes 41 for inserting the contacts 13c of the movable contact plate 13 on four positions of the peripheral edge. Also the depressing plate 14 is provided with threaded holes 43 respectively on both lateral sides nearly at the center thereof, and each threaded hole 43 locks a flanged spacer 31 made of synthetic resin having insulation property and inserted from the inserting hole 27 of the stationary contact plate 12 using a screw 50. The flanged spacer 31 defines the separation distance from the stationary contact plate 12 in the depressing plate 14, and serves as restricting means to insulate the depressing plate 14 from the stationary contact plate 12.

At the center of the depressing plate 14 is formed a tongue 42 with circumference cut away and bent downward. The tongue 42 projects downward through the locking hole 23 of the stationary contact plate 12, and fixes the terminal 19 using the rivet 17. A lead wire 8 electrically connected to the positive polarity side of the horn control circuit is connected to the terminal 19 utilizing clamping, and the conduction to movable contact plate 13 is performed through the depressing plate 14 made of sheet metal. On the other hand, the stationary contact plate 12 after assembling to the steering wheel body is electically connected to the negative polarity side of the horn control circuit through the energy absorber 10, a boss plate 60, a boss 61 and the like.

Also the base portion 13a of the movable contact plate 13 may be provided at the tongue 42, and the tongue 42 projects downward through a hole of the stationary contact plate 12.

A depressing horn pad 11 comprising an insert 11A made of semi-hard synthetic resin having shape holding property and a coating layer 11B made of soft synthetic resin is arranged above the depressing plate 14 as shown in FIGS. 3, 6 and 8. In the depressing horn pad 11, a nut 11a shown in FIG. 8 is embedded to the rear side of the steering wheel W and also to the front side thereof. A screw 30 is threadedly engaged with the nut 11a at the rear side of the steering wheel through the threaded hole 21a of the projection 21 in the stationary contact plate 12, and also threadedly engaged with a nut (not shown) at the front side of the steering wheel through a threaded hole 10c (refer to FIG. 7) formed on the base portion 10b of the energy absorber 10, thereby the depressing horn pad 11 is assembled to the energy absorber 10 fixing the stationary plate 12. The projection 11b projecting from the rear surface of the depressing horn pad 11 is inserted to the positioning hole 21b in the projecting member 21 of the stationary contact plate 12 during the assembling, and facilitates the positioning work.

When the insert 11A is disposed on an upper portion of the depressing horn pad 11, the depressing plate 14 may be removed such that the depressing horn pad 11 depresses directly the movable contact plate 13.

Next, assembling of the horn switch mechanism H1 in the first embodiment will be described. first, the stationary contact plate 12 is previously fixed abouve the deforming member 10a of the energy absorber 10 utilizing the screw 20 or welding, and the terminal 19 with the lead wire 8 connected to the tonge 42 of the depressing plate 14 is locked by the rivet 17.

As shown in FIG. 4., the base portion 13a of the movable contact plate 13 is arranged on the base member 51 of the electrical insulation spacer 15, and the thin or hinge portions 55, 55 are bent and the base portion 13a of the movable contact plate 13 is held by the projection piece 56 and the base member 51. In this case, the locking projection 54 of the base member 51 is locked to the peripheral edge of the locking hole 58 of the locking leg 57 in the projection piece 56 thereby holding the movable contact plate 13.

At that time, a hook portion 57a of the locking leg 57 of the projection piece 56 and a hook portion 53a of the locking leg 53 of the base member 51 are locked to the locking portions 24, 25 at the peripheral edge of the locking hole 23 in the stationary contact plate 12.

The contacts 13c of the movable contact plate 13 are disposed in the through hole 41 and the flanged spacer 31 inserted from the lower side is interposed in the inserting hole 27 of the stationary contact plate 12, and screws 50 is threadedly engaged with the threaded holes 43, 43 and the depressing plate 14 is fixed above the stationary contact plate 12.

Subsequently the screws 30 are threadedly engaged with the nuts 11a embedded at the front and rear sides of the steering wheel W in the depressing horn pad 11 through the threaded hole 21a of the projecting member 21 of the stationary contact plate 21 or the threaded hole 10c of the base portion 10b in the energy absorber 10, and the depressing horn pad 11 is fixed to the energy absorber 10.

Figure 9:
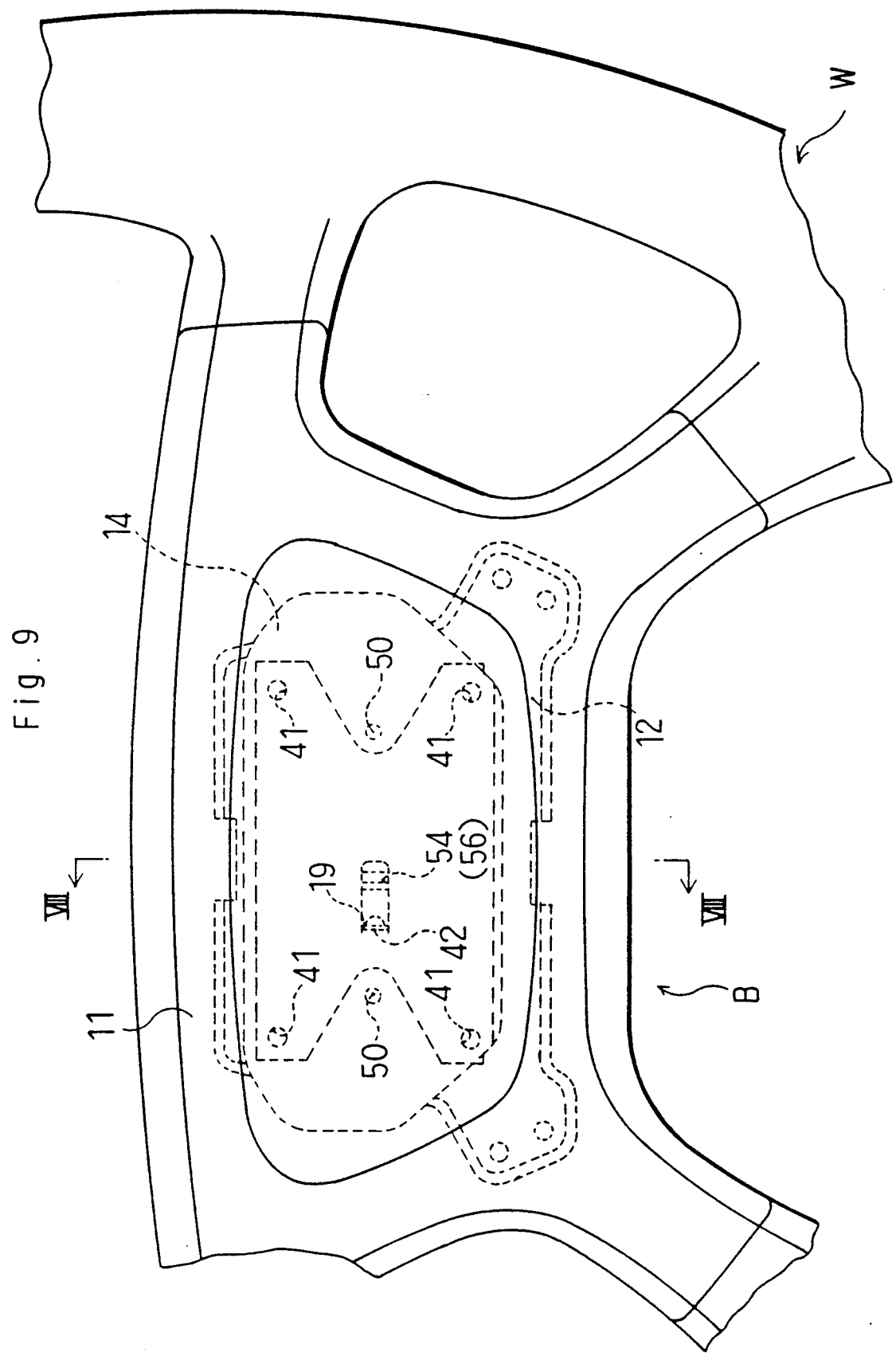
FIG. 9 is a plan view of a steering wheel illustrating assembling state in the first embodiment.

Energy absorber 10 together with the horn switch mechanism H1 is fixed to the steering wheel body where the boss plate 60 or the like in the steering wheel W is arranged (refer to FIG. 9). In the fixing mode, as shown in FIG. 8, the tongue 10d with the nut 10e formed at the base portion 10b of the energy absorber 10 and the locking leg 10f (refer to FIG. 8) locked by the screw 10g (refer to FIG. 7) to the base portion 10b are utilized, and the tongue 10d is fixed to the plate 60a extending upward from the boss plate 60 utilizing the screw 63 and the locking leg 10f is locked to the locking cylinder 62a of the lower cover 62.

The steering wheel W with the horn switch mechanism H1 and the energy absorber 10 assembled thereto is installed to the vehicle, and then the depressing horn pad 11 is depressed, whereby the contacts 13c of the contact portion 13b of the movable contact plate 13 are brought into contact with the contacts 12a of the stationary contact plate 12 through the depressing plate 14 so as to operate the horn.

Consequently, in the horn switch mechanism H1 of the first embodiment, during the assembling, an electrical insulation ring 6 in the prior art becomes unnecessary and by only utilizing one electrical insulation spacer 15, the movable contact plate 13 can be assembled to the stationary contact plate 12 and therefore the number of the assembling parts can be decreased.

The lead wire 8 connected to the movable contact plate 3 in the prior art may be connected to the depressing plate 14, and the connection is performed only in that the terminal 19 with the lead wire 8 connected thereto is locked by the rivet 17 to the tongue 42 of the depressing plate 14. Consequently, in comparison to the prior art where the four parts, i.e., the movable contact plate 3, the electrical insulation plate 5, the electrical insulation ring 6 and the terminal 9, together are locked by the rivet 7, since only the two parts, i.e., the tongue 42 and the terminal 19, are locked by the rivet 17, the connecting work can be performed easily.

In the first embodiment, since the projections 52 for positioning both sides of the base portion 13a of the movable contact plate 13 are formed on the upper surface of the base member 51, the positioning during arranging the base portion 13a onto the base member 51 becomes easy. In this connection, the projections 52 need not be installed at the four positions but, for example, the two projections 52 may be installed along the major axis direction of the base member 51 nearly at the center of the upper surface of the base member 51 and fitting holes corresponding to these projections may be provided on the base portion 13a of the movable contact plate 13.

Also in the first embodiment, since the rivet 17 to be used during connecting the terminal 19 to the tongue 42 of the depressing plate 14 is different from the rivet 7 for connecting the four parts in the prior art and may be used for connecting the two parts only, a small rivet in comparison to the rivet 7 in the prior art may be used and the resource saving is realized.

In the first embodiment, in the connection between the depressing plate 14 and the lead wire 8, the terminal 19 is locked by the rivet 17 to the tongue 42. However, the tongue 42 may be clamped and the lead wire 8 may be directly connected. Further, a fitting portion which can be connected by inserting the terminal 19 may be formed below the tongue 42.

Figure 10:
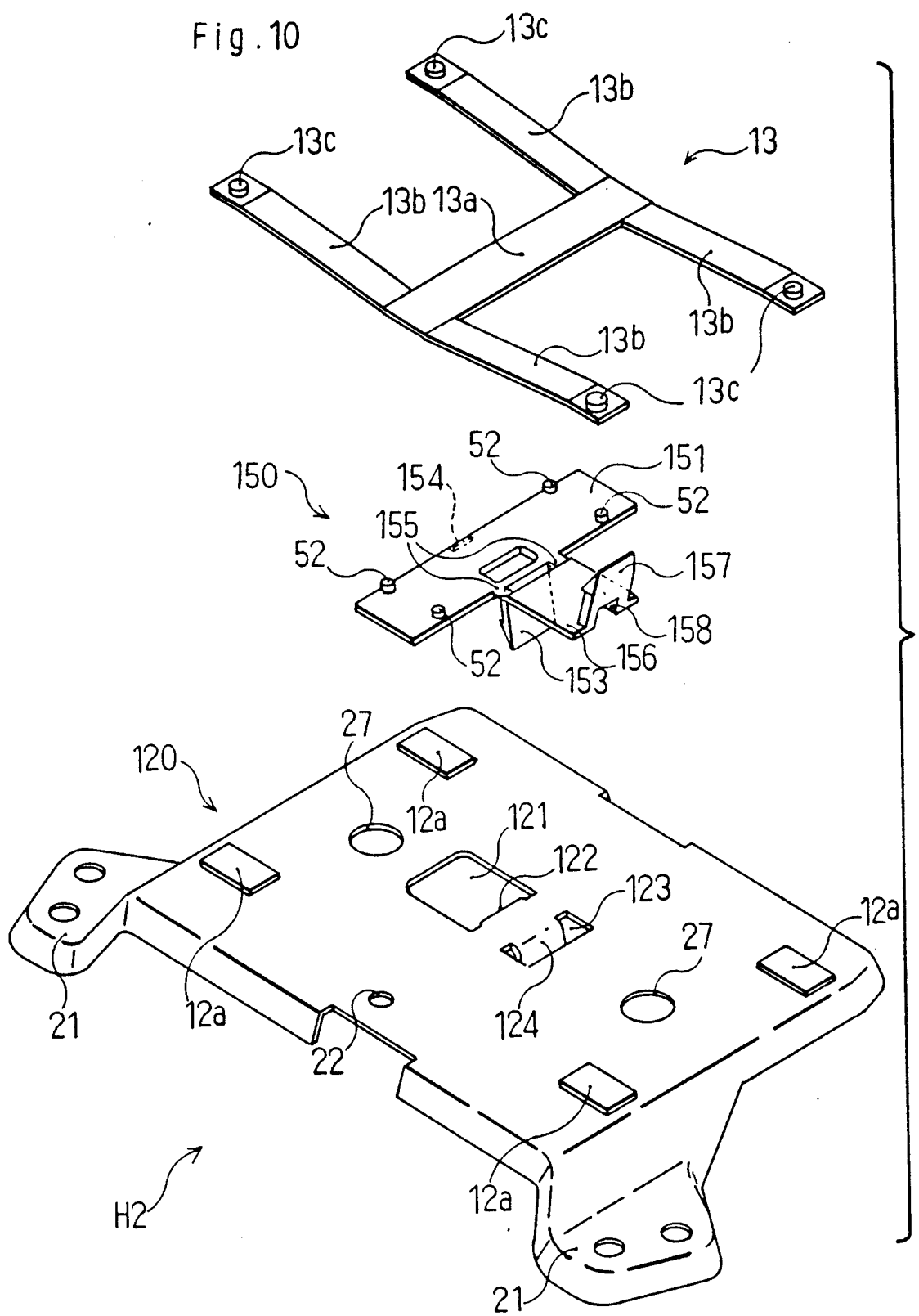
FIG. 10 is a perspective view of a movable contact plate, an electrical insulation spacer and a stationary contact plate in a second embodiment.
Figure 11:
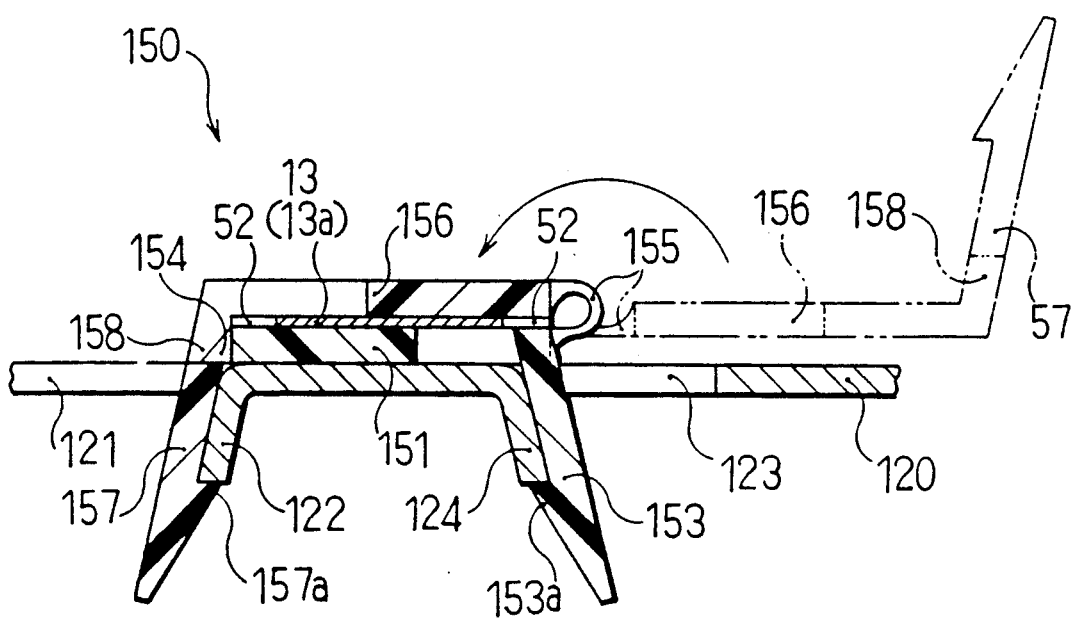
FIG. 11 is a sectional view illustrating mode that a movable contact plate in the second embodiment is assembled to a stationary contact plate.

Further in the first embodiment, one locking hole 23 to lock the locking legs 53, 57 of the electrical insulation spacer 15 is provided in the stationary contact plate 12. However, as in a horn switch mechanism H2 of a second embodiment shown in FIGS. 10 and 11, two locking holes 121, 123 may be formed in a stationary contact plate 120.

These locking holes 121, 123 are formed adjacent to each other along the minor axis direction of the base portion 13a of the movable contact plate 13, and locking portions 122, 124 bend downward are formed to a peripheral edge of the adjacent portions of 121, 123. The locking hole 121 is formed larger than the locking hole 123 so that the tongue 42 of the depressing plate 14 is inserted downward.

On the other hand, in an electrical insulation spacer 150 fixed to the stationary contact plate 120, a locking leg 153 projecting from a base member 151 and a locking leg 157 of a projection piece 156 extending through thin or hinge portions 155, 156 from base member 151 are provided with hook portions 153a, 157a projecting in the reverse direction, being different from the hook portions 53a, 57a of the locking legs 53, 57 of the electrical insulation spacer 15 (refer to FIG. 4).

The base portion 13a of the movable contact plate 13 is disposed on the base member 151, and the thin or hinge portion 155 is bent and the base portion 13a is held by the base member 151 and the projection piece 156. In this state, the locking legs 153, 157 may be locked and assembled to the locking portions 122, 124 at the peripheral edge of the two locking holes 121, 123. Members 154, 158 constitute an engaging part to maintain the holding state of the base portion 13a of the movable contact plate 13, and numeral 154 designates a locking projection formed on the base member 151 and numeral 158 designates a locking hole formed at the base portion side of the locking leg 157 of the projection piece 158.

Figure 12:
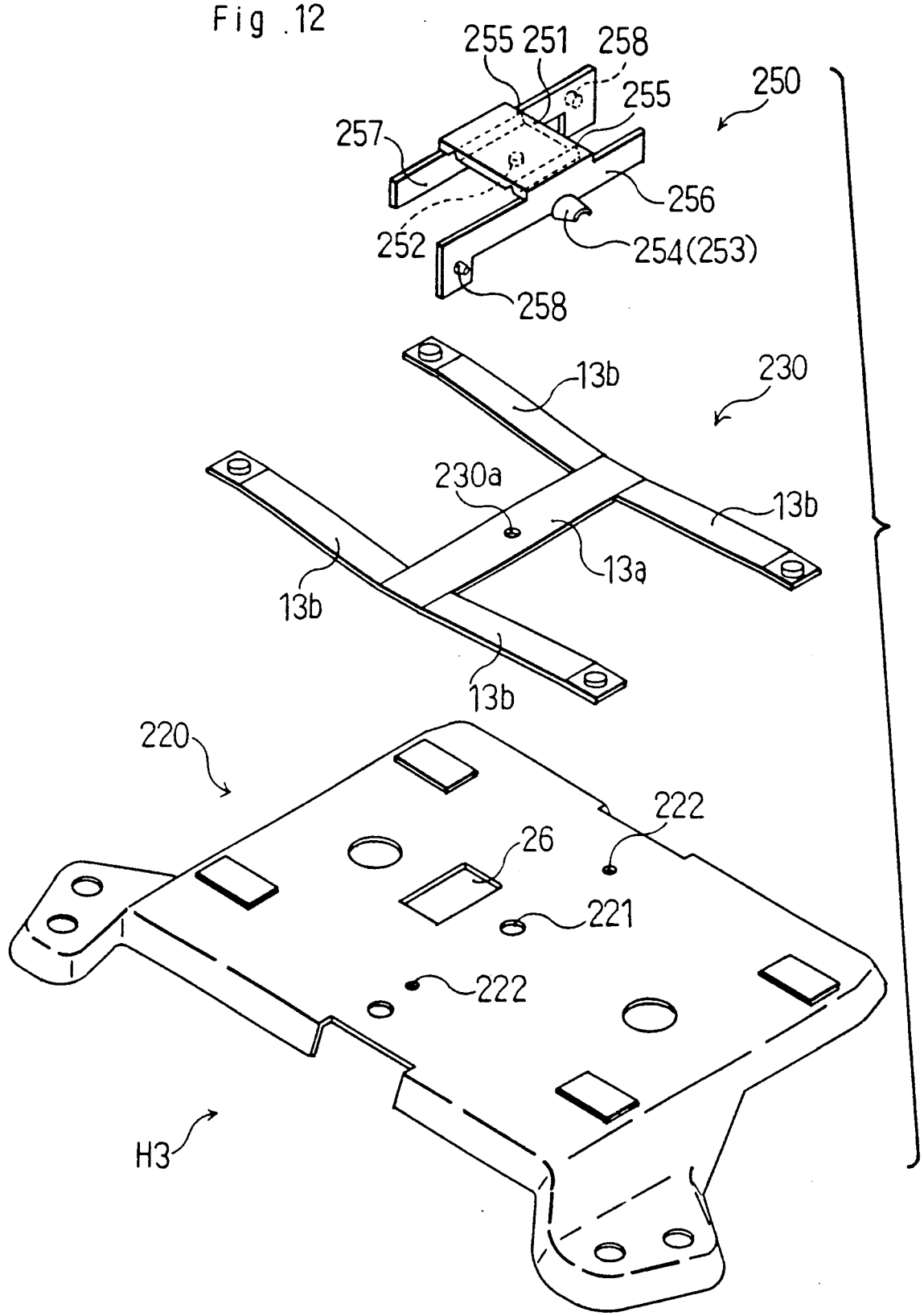
FIG. 12 is a perspective view of a movable contact plate, an electrical insulation spacer and a stationary contact plate in a third embodiment.
Figure 13:
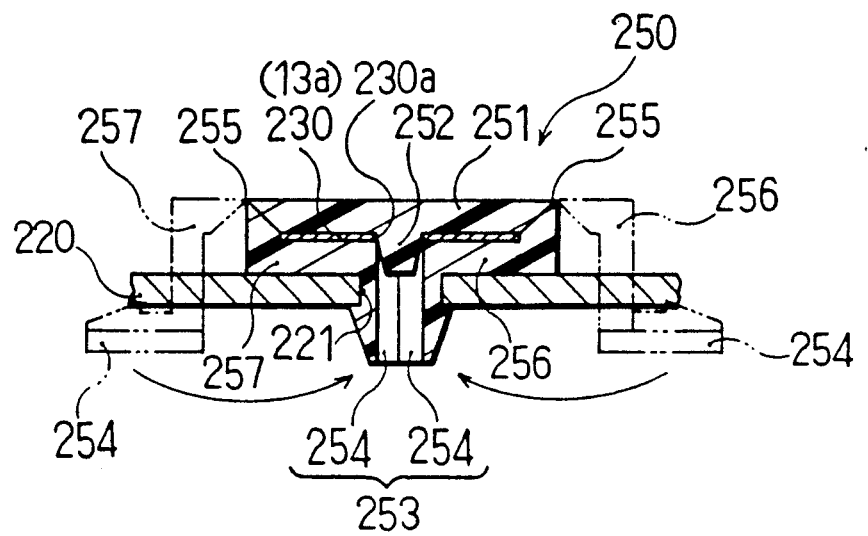
FIG. 13 is a sectional view illustrating mode that a movable contact plate in the third embodiment is assembled to a stationary contact plate.
Figure 14:
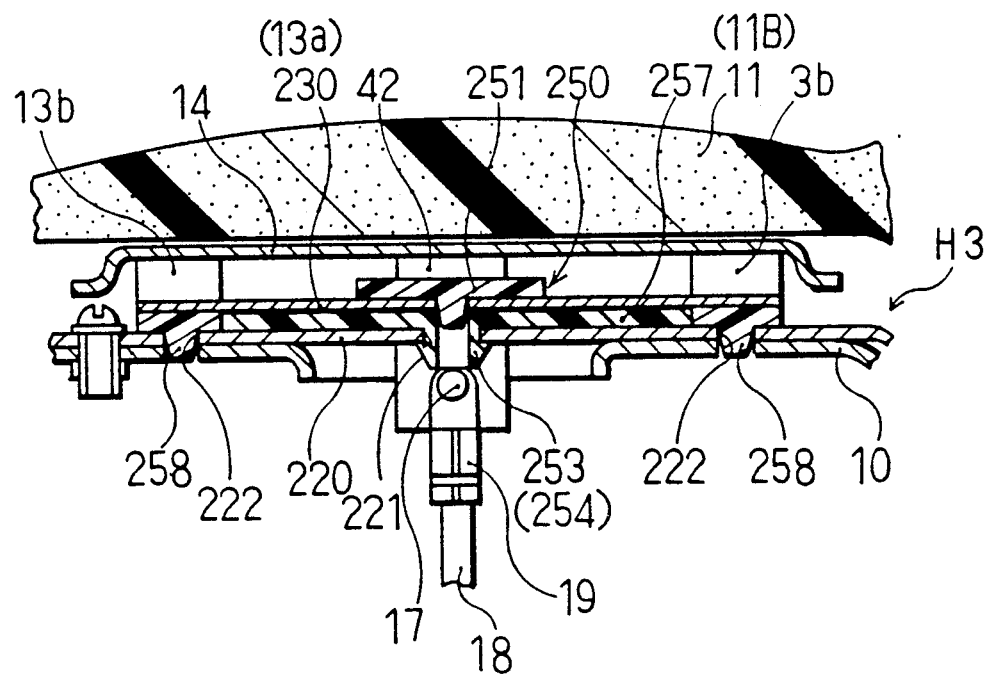
FIG. 14 is a sectional view of the third embodiment.

Further in the horn switch mechanisms H1, H2 of the first and second embodiments, each of the electrical insulation spacers 15, 150 is constituted by one projection 56, 156 projecting from the base member 51, 151. However, it may be constituted as in a horn switch mechanism H3 of a third embodiment shown in FIGS. 12-14.

An electrical insulation spacer 250 of the third embodiment is made of similar material to that of the electrical insulation spacer 15, 150. and two projection pieces 256, 257 are formed on both sides of a base member 251 through a thin portion 255 respectively. In this configuration, the upper and lower surfaces of the base portion 13a of a movable contact plate 230 are held by two projection pieces 256, 257 and the base member 251. Positioning projections 252, 258 are formed respectively to the base member 251 and the projection pieces 256, 257 of the electrical insulation spacer 250. These positioning projections 252, 258 are inserted respectively to a positioning hole 230a formed on the base portion 13a of the movable contact plate 230 and positioning holes 222, 222 formed on the stationary contact plate 220.

In the projection pieces 256, 257 of the electrical insulation spacer 250, when each of the projection pieces 256, 257 is bent to hold the base portion 13a of the movable contact plate 230, a locking leg 254 is formed so that one locking leg 253 is locked to the peripheral edge of the locking hole 221 of the stationary contact plate 220 can be formed.

Figure 15:
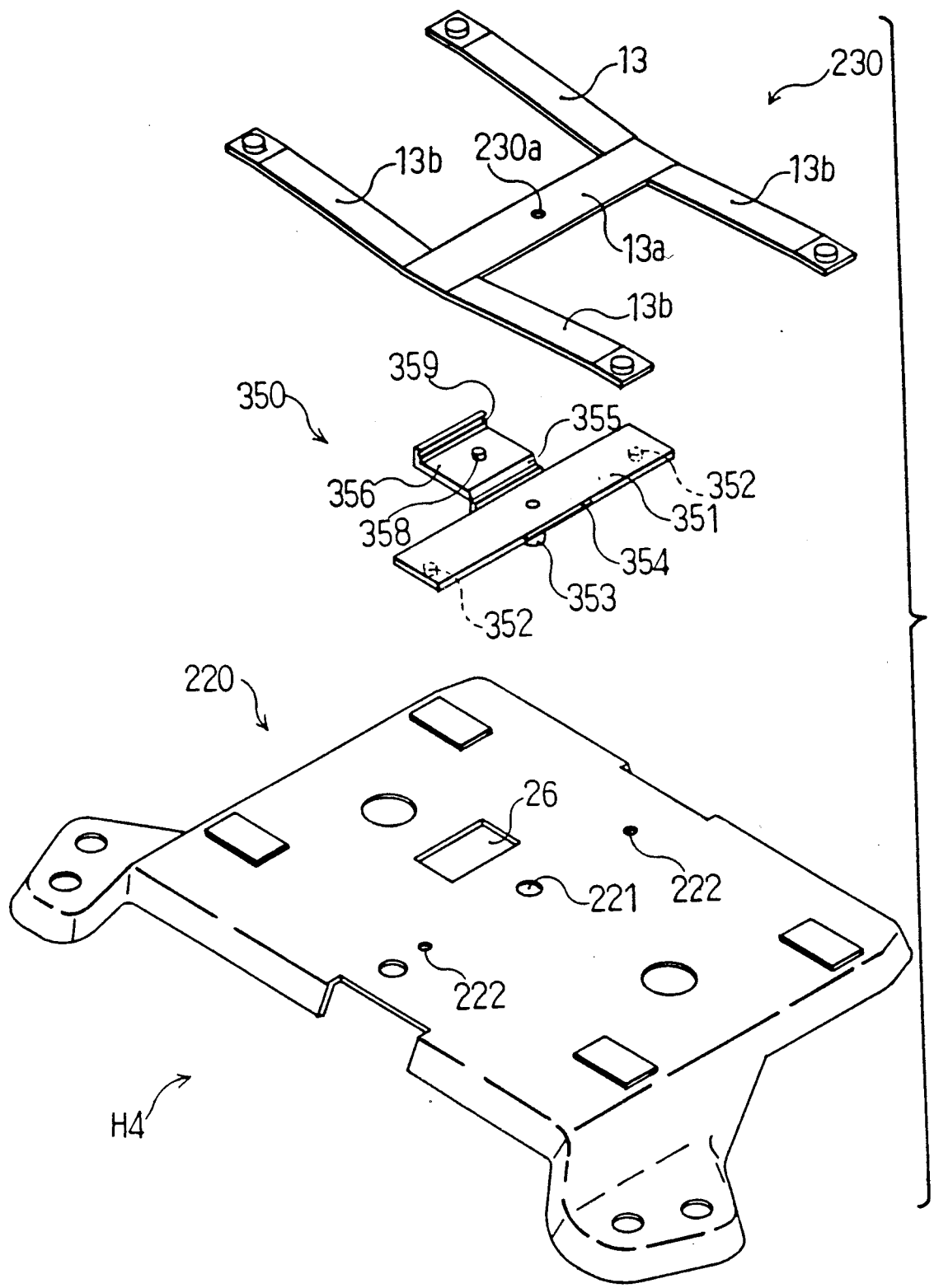
FIG. 15 is a perspective view of a movable contact plate, an electrical insulation spacer and a stationary contact plate in a fourth embodiment.
Figure 16:
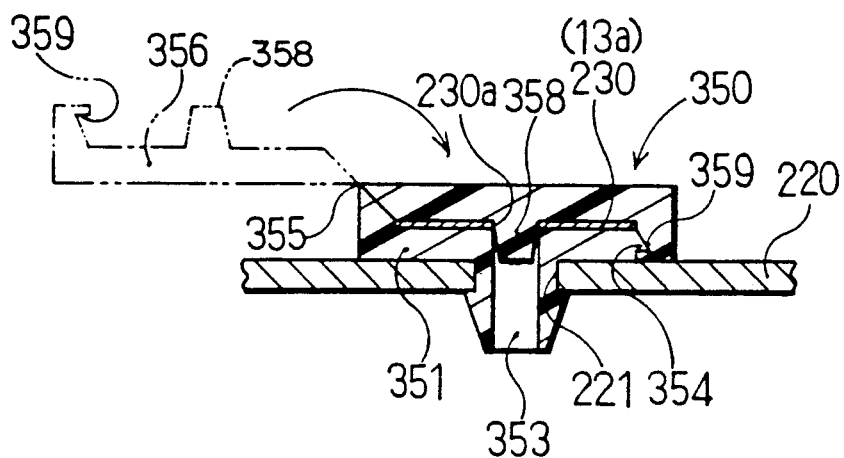
FIG. 16 is a sectional view illustrating mode that a movable contact plate in the fourth embodiment is assembled to a stationary contact plate.
Figure 17:
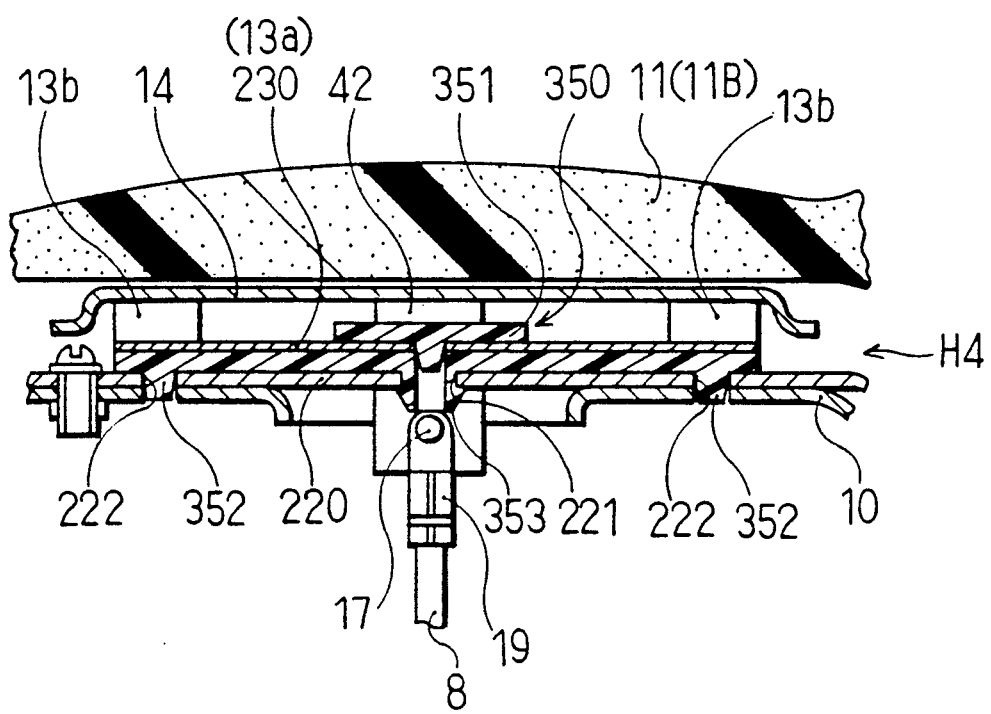
FIG. 17 is a sectional view of the fourth embodiment.
Figure 18:
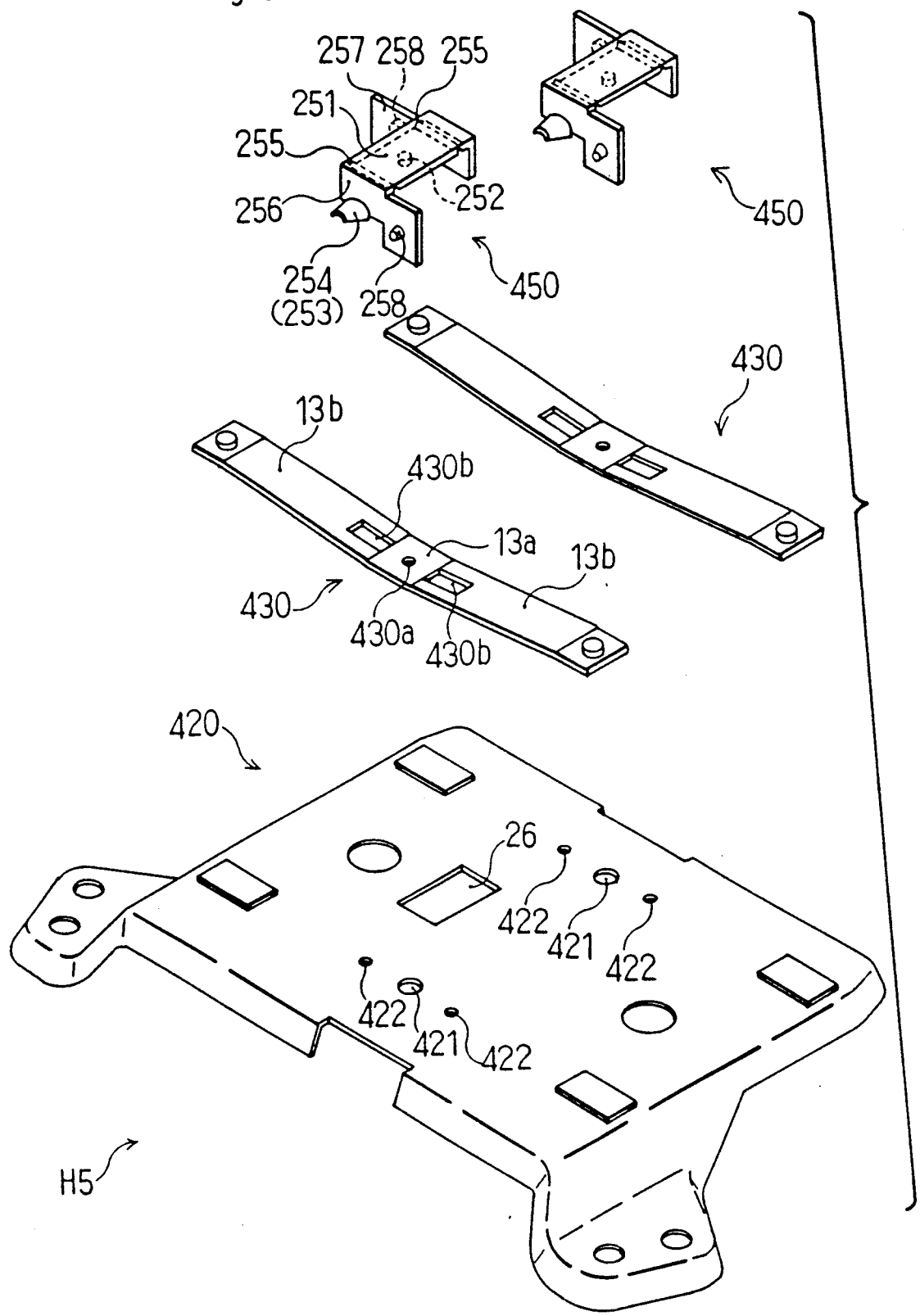
FIG. 18 is a perspective view of a movable contact plate, an electrical insulation spacer and a stationary contact plate in a fifth embodiment.
Figure 19:
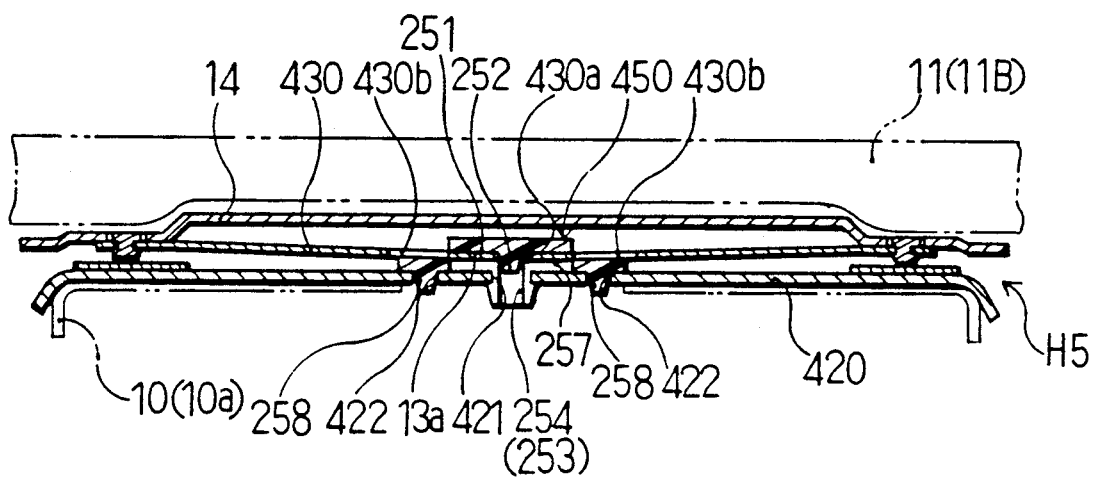
FIG. 19 is a sectional view of the fifth embodiment.
Figure 21:
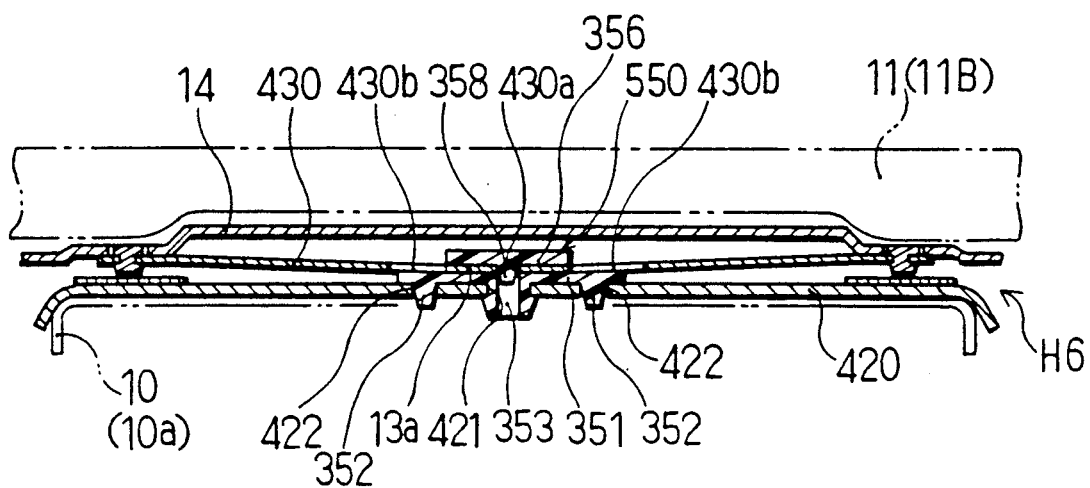
FIG. 21 is a sectional view of the sixth embodiment.

Further in the horn switch mechanisms H1, H2 of the first and second embodiments, each of the electrical insulation spacers 15, 150 is constituted by arranging two locking legs 53, 57, 153, 157 respectively. However, it may be constituted as in a horn switch mechanism H4 of a fourth embodiment shown in FIGS. 15-17.

An electrical insulation spacer 350 of the fourth embodiment is made of similar material to that of the electrical insulation spacer 15, 150, and one locking leg 353 locked to peripheral edge of the locking hole 221 of the stationary contact plate 220 is formed on the lower surface at the center of a base member 351. The electrical insulation spacer 350 is provided with positioning projections 352, 352 formed on the base member 351 and inserted to the positioning hole 222 of the stationary contact plate 220, and a positioning projection 358 formed on a projection piece 356 projection from the base member 351 through a thin or hinge portion 355 and inserted to the positioning hole 230a of the movable contact plate 230.

In the base member 351 and the projection piece 356 of the electrical insulation spacer 350, in order to hole the base portion 13a of the movable contact plate 230, a locking projection 354 and a locking recess 359 are formed as an engaging part to engage members with each other in a predetermined position.

Further in the first through fourth embodiments, although the movable contact plate 13, 230 is of the turned H shape viewing from the upper side, a movable contact plate 430 of dash-like shape viewing from the upper side may be used as in horn switch mechanisms H5, H6 of fifth and sixth embodiments shown in FIGS. 18-21.

The movable contact plate 430 is provided with the base portion 13a on which a positioning hole 420a is formed and the contact portions 13b extending upward from the base portion 13a. Numeral 430b designates a through hole to reduce the spring resiliency of the contact portions 13b.

In electrical insulation spacers 450, 550 used in each of the horn switch mechanisms H5, H6, the base members 251, 351 of the electrical insulation spacers 250, 350 of the third and fourth embodiments or the projection pieces 256, 257, 356 projecting from the base members 251, 351 through the thin or hinge portions 255, 355 are shortened respectively, and similar members are provided, Numeral 421 in FIGS. 18-21 designates a locking hole of a stationary contact plate 420 to lock the locking legs 253, 353 of the electrical insulation spacers 450, 550 at a peripheral edge, and numeral 422 designates a positioning hole for inserting the positioning projections 258, 352 of the electrical insulation spacers 450, 550. In this connection, the positioning projections 252, 358 of the electrical insulation spacers 450, 550 are inserted in the positioning hole 430a of the movable contact plate 430.

In the third through sixth embodiments, the positioning holes 222, 422 of each stationary contact plate or the positioning projections 258, 352 of each electrical insulation spacer are provided in pairs respectively. However, since the locking legs 253, 353 of each electrical insulation spacer are locked to peripheral edges of the locking holes 221, 421 of each stationary contact plate, in order to prevent the rotation of the electrical insulation spacers 250, 350, 450, 550 with respect of the stationary contact plates 220, 420, respective positioning holes 222, 422 or the positioning projections 258, 352 may be provided. In this connection, the rotation of the movable contact plate 230, 430 with respect to each of the electrical insulation spacers 250, 350, 450, 550 in the third through sixth embodiments is prevented bacause the base portion 13a of each movable contact plate is held by the base members 251, 351 and the projection pieces 256, 257, 356 of respective electrical insulation spacers when the positioning projections 252, 358 of each electrical insulation spacer are inserted to the positioning holes 230a, 430a of each movable contact plate.

What is claimed is:

1. A horn switch mechanism for a steering wheel, comprising:
   (a) a stationary contact plate having a locking hole;
   (b) a movable contact plate having a base portion and contact portions extending upwardly from said base portion, said base portion being fixed with respect to said stationary contact plate;
   (c) a depressing horn pad disposed above said moveable contact plate; and
   (d) an electrical insulation spacer disposed between said stationary contact plate and said movable contact plate, said electrical insulation spacer comprising a base member, a projection piece for holding said base portion of said movable contact plate in cooperation with said base member, said projection piece projecting from said base member, said projection piece being interconnected to said base member through a thin, hinge portion, and a pair of locking legs, said locking legs being engagable with a peripheral edge of said locking hole of said stationary contact plate, one of said locking legs being provided on said base member, the other of said locking legs being provided on said projection piece.

2. A horn switch mechanism for a steering wheel as set forth in claim 1, wherein said projection piece projects through said hinge portion from a first longitudinal side edge of said base member, said projection piece projecting from said base member by an amount substantially corresponding to a width dimension of the base portion of the movable contact plate;
   said one locking leg extending from said first longitudinal side edge of said base member; and
   further comprising a first engaging means provided on a second longitudinal side edge of said base member;
   said projection piece further including a second engaging means engageable with said first engaging means.

3. A horn switch mechanism of a steering wheel as set forth in claim 1, wherein said stationary contact plate is provided with one locking hole, and said each locking leg of said electrical insulation spacer is locked to a peripheral edge of said one locking hole.

4. A horn switch mechanism for a steering wheel as set forth in claim 1, wherein said stationary contact plate is provided with two locking holes, and said each locking leg of said electrical insulation spacer is locked to a peripheral edge of each locking hole of said two locking holes.

5. A horn switch mechanism for a steering wheel as set forth in claim 1, wherein projections for positioning both edges in a minor axis direction in said base portion of said movable contact plate are formed on said base member of said electrical insulation spacer.

6. A switch mechanism for a steering wheel as set forth in claim 1, further comprising a depressing plate, said depressing plate being in contact with upper surfaces of said contact portions of said movable contact plate, said depressing plate being electrically insulated from said stationary contact plate and being held at a predetermined distance from said stationary contact plate, said depressing plate having a tongue electrically connected to a lead wire.

7. A horn mechanism for a steering wheel, comprising:
   (a) a stationary contact plate having a locking hole;
   (b) a movable contact plate having a base portion and contact portions extending upwardly from said base portion, said base portion being fixed with respect to said stationary contact plate;
   (c) a depressing horn pad disposed above said movable contact plate; and
   (d) an electrical insulation spacer disposed between said stationary contact plate and said movable contact plate, said electrical insulation spacer comprising a base member, a pair of projection pieces projecting from said base member, each said projection piece being interconnected to said base member through a thin, hinge portion, said projection pieces holding, in cooperation with the base member, the base portion of the movable contact plate, each of said projection pieces having a locking leg portion defining a locking leg engageable with a peripheral edge of said locking hole of said stationary contact plate.

8. A horn switch mechanism for a steering wheel as set forth in claim 7, wherein said movable contact plate has a positioning hole in said base portion, said electrical insulation spacer having a positioning projection defined on a lower surface of said base member for insertion in said positioning hole of said movable contact plate.

9. A horn switch mechanism for a steering wheel as set forth in claim 7, wherein said stationary contact plate has positioning holes thereon, each of said projection pieces being provided with a positioning projection engageable with a peripheral edge of a respective positioning hole.

* * * * *